(12) United States Patent
Prehofer

(10) Patent No.: US 7,151,926 B2
(45) Date of Patent: Dec. 19, 2006

(54) METHOD FOR CONFIGURING TECHNICAL SYSTEMS VIA MOBILE TELEPHONE TERMINALS

(75) Inventor: Christian Prehofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 302 days.

(21) Appl. No.: 10/344,949

(22) PCT Filed: Aug. 16, 2001

(86) PCT No.: PCT/DE01/03125

§ 371 (c)(1),
(2), (4) Date: Feb. 19, 2003

(87) PCT Pub. No.: WO02/15622

PCT Pub. Date: Feb. 21, 2002

(65) Prior Publication Data

US 2003/0162532 A1    Aug. 28, 2003

(30) Foreign Application Priority Data

Aug. 17, 2000  (DE) ............................ 100 40 230
Sep. 27, 2000  (DE) ............................ 100 47 919

(51) Int. Cl.
H04M 3/00    (2006.01)
H04M 3/42    (2006.01)
H04Q 7/22    (2006.01)
H04Q 7/28    (2006.01)

(52) U.S. Cl. .................. 455/418; 455/414.1; 455/420; 455/557

(58) Field of Classification Search ........ 455/418–420, 455/414.1, 426.1, 413, 433, 445, 458, 466, 455/557, 552.1, 556.2, 412.1, 412.2; 709/206, 709/217, 219

See application file for complete search history.

(56) References Cited

U.S. PATENT DOCUMENTS

| 5,479,157 A | 12/1995 | Suman et al. |
| 6,026,291 A * | 2/2000 | Carlsson et al. ............ 455/406 |
| 6,028,537 A | 2/2000 | Suman et al. |
| 6,487,717 B1 | 11/2002 | Brunemann et al. |
| 6,546,002 B1 * | 4/2003 | Kim ........................... 370/351 |
| 6,615,186 B1 * | 9/2003 | Kolls ........................... 705/26 |
| 6,697,837 B1 * | 2/2004 | Rodov ....................... 709/203 |
| 6,741,855 B1 * | 5/2004 | Martin et al. ............... 455/419 |
| 6,782,253 B1 * | 8/2004 | Shteyn et al. ............ 455/414.1 |

FOREIGN PATENT DOCUMENTS

| DE | 42 38 301 | 5/1994 |
| DE | 195 48 393 | 7/1996 |
| DE | 195 48 394 | 7/1996 |
| DE | 196 04 059 | 8/1996 |
| DE | 197 23 099 | 12/1997 |
| DE | 196 30 857 | 2/1998 |
| DE | 198 23 122 | 12/1999 |
| DE | 100 01 130 | 7/2000 |
| DE | 199 43 342 | 3/2001 |
| FR | 2 696 384 | 4/1994 |
| GB | 2 296 584 | 7/1996 |
| GB | 2 296 800 | 7/1996 |
| GB | 2 334 673 | 9/1999 |
| WO | 94/01963 | 1/1994 |
| WO | 99/14965 | 3/1999 |

* cited by examiner

*Primary Examiner*—Binh K. Tieu
(74) *Attorney, Agent, or Firm*—Staas & Halsey LLP

(57) ABSTRACT

A user profile is set for a technical system controlled by an electronic device by transmitting user profile data representing the user profile from a mobile telephone terminal to the electronic device via a wireless transmission link.

11 Claims, 1 Drawing Sheet

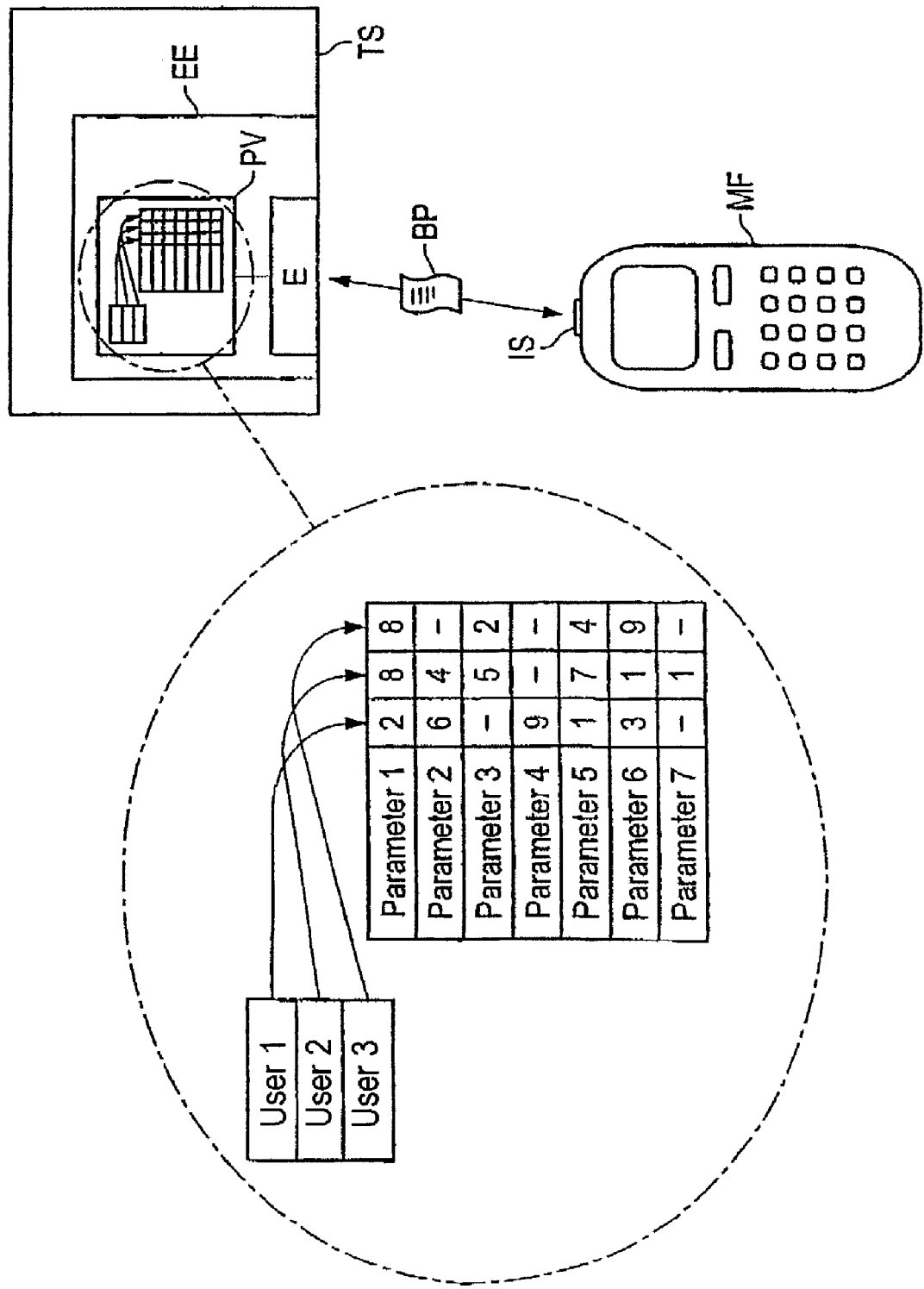

METHOD FOR CONFIGURING TECHNICAL SYSTEMS VIA MOBILE TELEPHONE TERMINALS

CROSS REFERENCE TO RELATED APPLICATIONS

This application is based on and hereby claims priority to German Application No. 100 402 30.5 filed on Aug. 17, 2000 and German Application No. 100 479 19.7 filed Sep. 27, 2000, the contents of which are hereby incorporated by reference.

BACKGROUND OF THE INVENTION

1. Field of the Invention

The invention relates to a method for adjusting a user profile in technical systems provided with an electronic device.

2. Description of the Related Art

With increasing operating and adjustment possibilities by miniaturized electronics on devices for everyday use, the amount of inputs and commands to be performed by the user increases. For this reason, very many technical systems also allow user-dependent adjustments, called user profiles in software engineering, to be stored with the aid of their electronic devices.

Some cars, for example, provide for the seat position, rear-view mirror and steering wheel position to be adjusted electrically and for the adjustment values then existing, which are also called user profile, to be saved. Once the driver has performed these adjustments once and stored them in a user profile, he can then rapidly restore his relevant user profile, if the adjustments have been changed by other persons, during the next use of the car by selecting his individual user profile by pressing a button.

In other fields, too, such a user profile can be generated by individually adjusting and then storing the associated adjustment values. Examples of this are the entries in an electronic telephone book associated with a user, the volume and answering machine settings of a telephone terminal and—in the industrial area—the adaptation of production machines to the preferences of the respective operator.

Even if all adjustment values of a user profile are stored at a first technical device, the same user must perform the same adjustments with a second technical device—even if it is a device of the same type.

When using a car from a company fleet or a hire company, for example, these adjustments in each case require considerable time consumption.

To avoid this time consumption in the field of telecommunication, therefore, use of a chip card has already been successful with the aid of which the user can adjust his own user profile merely by inserting a chip card at a communication terminal. He therefore does not need to manually reset his short code dialing destinations, his signaling volume etc. every time. With the expected increase in adjustment capabilities on technical systems, such chip cards will also be used widely in other types of technical systems. However, this requires that, to adjust an electronic device, a chip card suitable for this device must be carried along.

SUMMARY OF THE INVENTION

It is an object of the invention to specify a method by which the use of chip cards and, in particular, the provision of a multiplicity of different chip cards for adjusting the user profile in different technical systems can be avoided.

In the method according to the invention, elements of a mobile telephone terminal already in existence for storing user profiles and for transmitting them to the most varied types of technical systems are used. The mobile telephone terminal is a device which is almost always carried by a continuously increasing number of people and can be used for storing and transmitting person-related user profiles without great expenditure which is only restricted to an extension of the software in the mobile telephone terminal.

According to an advantageous development of the invention, existing user profiles or their associated adjustment values of the technical system can be read out and then stored and modified in the mobile telephone terminal. This means that changes in the user profile do not necessarily have to be performed on the electronic device of technical systems but can also be carried out at the mobile telephone terminal without the latter having to communicate with the technical system during the changing. In this connection, the definition of a number of user profiles for one user is also of advantage, for example in order to meet different production aspects in industrial production machines.

A development of the invention provides that the owner of the mobile telephone terminal authenticates himself at the technical device by transmitting an access code stored in conjunction with the user profile. An identification of the technical system is of advantage in order to selectively apply the method according to the invention to a technical system which has the same interface for the wireless transmission of user profiles as another technical system adjacent thereto, which is not to be adjusted.

In another advantageous embodiment of the invention, a person who wishes to set up or call up a user profile at the electronic device via his mobile telephone terminal must confirm this transmission process before initiation of the transmission at the mobile communication terminal by an input, for example by operating a key, at the technical system. This has the advantage that an unintended or malicious configuration of the technical system is avoided.

To provide a further explanation of an exemplary embodiment, the latter is explained in greater detail with reference to a drawing.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The FIGURE shows a diagrammatic representation of a mobile telephone terminal exchanging data with a technical system.

DETAILED DESCRIPTION OF THE PREFERRED EMBODIMENT

Reference will now be made in detail to the preferred embodiments of the present invention, examples of which are illustrated in the accompanying drawings, wherein like reference numerals refers to like elements throughout.

In the FIGURE, a technical system TS is shown which exhibits a user profile administration PV as part of an electronic device EE. A further component of the electronic device EE is the receiving unit E which transmits or receives data, e.g. via an infrared link. Communication with a mobile telephone terminal MF can take place with the aid of this receiving unit E. The FIGURE shows a mobile telephone terminal MF which has an infrared interface IS. Such infrared interfaces IS are known per se, for example in the mobile telephone terminal Siemens S35i. The electronic device EE receives via the receiving device E user profiles BP from the infrared interface IS of the mobile telephone terminal MF but can also send these in order to transmit user profiles BP stored at the electronic device EE into the memory of the mobile telephone terminal MF.

In the profile administration PV of the electronic unit EE, the user profiles BP are stored, e.g. in the form of a simple concatenated list. The list of individual user profile names ("user 1" to "user 3"), shown in the FIGURE, points to a respective associated column of parameter values which are correlated with the respective parameter names ("parameter 1" to "parameter 7") row by row in a second list. Thus, one column of the last-mentioned list in each case represents the user profile data of the linked user profile. The FIGURE shows that some parameters of a user profile were not defined by the associated user, thus for example the parameter 3 of the user profile "user 1" which has been marked blank ("–") in the FIGURE. User profiles BP can also be administered in a similar manner in the mobile telephone terminal MF.

The invention has been described in detail with particular reference to preferred embodiments thereof and examples, but it will be understood that variations and modifications can be effected within the spirit and scope of the invention.

The invention claimed is:

1. A method for adjusting a user profile in technical systems which are controlled by an electronic device, comprising:
    transmitting user profile data representing the user profile from the electronic device to a mobile telephone terminal via a wireless transmission link;
    storing the user profile data by the mobile telephone terminal for administrating in the mobile telephone terminal the user profile data for different electronic devices by one of reading out, storing and modifying adjustment values of the electronic device; and
    restoring the user profile in the electronic device by transmitting the user profile data from the mobile telephone terminal to the electronic device via the wireless transmission link.

2. The method as claimed in claim 1, further comprising transmitting an access code as component of the user profile data to enable access authorization at the electronic device.

3. The method as claimed in claim 2, further comprising transmitting an identification identifying the electronic device from the mobile telephone terminal before said transmitting of the user profile data.

4. The method as claimed in claim 3, further comprising administrating different user profiles for different electronic devices in the mobile telephone terminal.

5. The method as claimed in claim 4, wherein said transmitting between the mobile telephone terminal and the electronic device is carried out via an infrared interface.

6. The method as claimed in claim 4, wherein said transmitting between the mobile telephone terminal and the electronic device is carried out via a wireless interface according to a Bluetooth standard.

7. The method as claimed in claim 6, further comprising inputting a confirmation at the technical system prior to said transmitting of the user profile data.

8. An electronic system for control of adjusting a user profile in electronic devices, the system comprising:
    a first storage device that stores the user profile data in an electronic device;
    a second storage device in a mobile telephone terminal for administrating different user profiles for different electronic devices using the mobile telephone terminal by at least one of reading out, storing, and modifying adjustment values of the electronic device;
    a first transceiver device that transmits user profile data representing the user profile from the electronic device to the mobile telephone terminal via a wireless transmission link;
    a second transceiver device for restoring the user profile in the electronic device by transmitting the user profile data from the mobile telephone terminal to the electronic device via the wireless transmission link, the second transceiver device including an access code as a component of the user profile data to enable access authorization at the electronic device and an identification identifying the electronic device from the mobile telephone terminal before said transmitting of the user profile data.

9. The electronic system as in claim 8, further comprising an infrared interface for transmitting between the mobile telephone terminal and the electronic device.

10. The electronic system as in claim 8, further comprising a wireless interface for transmitting between the mobile telephone terminal and the electronic device according to a Bluetooth standard.

11. The electronic system as in claim 10, wherein the second transceiver device inputs a confirmation at the technical device prior to said transmitting of the user profile data.

* * * * *